(12) United States Patent
Umemura et al.

(10) Patent No.: US 7,201,235 B2
(45) Date of Patent: Apr. 10, 2007

(54) DRIVER DRILL

(75) Inventors: Shingo Umemura, Anjo (JP); Masahiko Miura, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/984,039

(22) Filed: Nov. 9, 2004

(65) Prior Publication Data

US 2005/0150669 A1   Jul. 14, 2005

(30) Foreign Application Priority Data

Jan. 9, 2004   (JP) .............................. 2004-004610

(51) Int. Cl.
*E21B 1/14* (2006.01)
*E21B 4/04* (2006.01)
*E21B 6/08* (2006.01)

(52) U.S. Cl. ...................... 173/217; 173/104; 173/109; 173/216

(58) Field of Classification Search ................ 173/48, 173/104, 109, 216, 217; 408/124
See application file for complete search history.

(56) References Cited

U.S. PATENT DOCUMENTS

| | | | | |
|---|---|---|---|---|
| 5,343,961 A | * | 9/1994 | Ichikawa | 173/48 |
| 5,531,278 A | * | 7/1996 | Lin | 173/176 |
| 6,142,242 A | * | 11/2000 | Okumura et al. | 173/48 |
| 6,202,759 B1 | * | 3/2001 | Chen | 173/48 |
| 6,305,481 B1 | * | 10/2001 | Yamazaki et al. | 173/178 |
| 6,338,404 B1 | * | 1/2002 | Chen | 192/223 |
| RE37,905 E | | 11/2002 | Bourner et al. | |
| 6,745,883 B2 | * | 6/2004 | Eto et al. | 192/56.62 |
| 6,892,827 B2 | * | 5/2005 | Toyama et al. | 173/48 |
| 2001/0035326 A1 | | 11/2001 | Furuta et al. | |
| 2002/0153219 A1 | | 10/2002 | Chen | |

FOREIGN PATENT DOCUMENTS

| | | |
|---|---|---|
| DE | 33 21 635 A1 | 12/1984 |
| DE | 90 16 415 U1 | 7/1991 |
| JP | 09-079292 A1 | 3/1997 |
| JP | 2003/191113 | 7/2003 |

* cited by examiner

*Primary Examiner*—Rinaldi I. Rada
*Assistant Examiner*—Nathaniel Chukwurah
(74) *Attorney, Agent, or Firm*—Burr & Brown

(57) ABSTRACT

A driver drill that can effectively prevent erroneous clutch operation in a drill mode is provided. A flat washer positioned between steel balls for locking an internal gear and a coil spring is rotatable by rotative operation of a mode-change ring. Also, protruding streaks are provided on a small-diameter unit of a second gear case around which a flat washer is externally mounted. The protruding streaks interfere with internal projections on an inner circumference of the flat washer at its predetermined rotating position to regulate a forward movement of the flat washer. When a drill mode is selected with the mode-change ring, the flat washer is locked by the protruding streaks.

7 Claims, 8 Drawing Sheets

DRIVER DRILL

BACKGROUND OF THE INVENTION

This application claims the benefit of Japanese Patent Application Number 2004-4610 filed Jan. 9, 2004, the entirety of which is incorporated by reference.

1. Field of the Invention

The present invention relates to a driver drill usable with a selection of a clutch mode and a drill mode.

2. Description of the Related Art

In a driver drill, firstly, a clutch mode is achieved in a planetary gear reduction mechanism disposed between a motor and a spindle with a structure in which one of internal gears interlocked with the circumference of planetary gears can be rotated within a housing. Also, the internal gear is pressed and locked by a coil spring through steel balls held by a gear case accommodating the planetary gear reduction mechanism and engaged with an end face of the internal gear and through a washer externally provided to the gear case so as to abut on the steel balls. That is, when a load on the spindle is increased to exceed a biasing force of the coil spring, the internal gear idles to interrupt the transfer of rotation to the spindle.

On the other hand, a drill mode is achieved by a locking means that makes a spring holder for holding the coil spring or another pressing member directly abut on the washer disposed between the steel ball and the coil spring by rotative operation of an operating member, such as a change ring, thereby regulating the movement of the washer. However, as tolerances of the components, such as the washer and the pressing member, is increasingly accumulated, the washer might move to operate the clutch even in the drill mode. To solve this problem, in a clutch mechanism disclosed in Japan Published Unexamined Patent Application No. 9-79292, protrusions are provided so as to abut on the outer circumference of the washer and an inner surface of a cap as an operating member. According to this mechanism, when the drill mode is selected, the protrusions of the cap ride on the protrusions of the washer, thereby regulating the movement of the washer without a spring holder.

However, the clutch mechanism disclosed in the above patent document is designed to regulate the movement of the washer externally provided to the housing by using a cap, which is a member separated from the housing. Therefore, even with the clutch mechanism, an influence of the tolerances of the housing and the cap cannot be eliminated. After all, the possibility of the occurrence of erroneous operation of the clutch in the drill mode cannot be prevented.

SUMMARY OF THE INVENTION

Therefore, an object of the present invention according to a first aspect is to provide a driver drill that can effectively prevent erroneous clutch operation in a drill mode and can achieve excellent reliability.

To achieve the object mentioned above, in the first aspect of the present invention, a locking means for regulating the movement of an intermediate member, such as a washer, serves as an interfering unit provided with a gear case to interfere with the intermediate member at a predetermined rotating position of the intermediate member to regulate the movement, and the rotative operation of the operating member enables the intermediate member to rotate to a lock position where interference occurs with the interfering unit and to a lock-releasing position where no interference occurs with the same, thereby allowing the clutch mode and the drill mode to be selected.

In a second aspect of the present invention based on the first aspect, the driver drill further includes a cam means that can add percussion operation to an axial direction in conjunction with the spindle. In order to achieve excellent operability associated with selection of the operation mode, the operating member has a third rotating position other than rotating positions in the clutch mode and the drill mode, where the cam means is in conjunction with the spindle and the intermediate member interferes with the interfering unit. Then, by rotative operation of the operating member, a percussion mode in which percussion is transferred to the spindle can be further selected.

In a third aspect of the present invention based on the first or second aspect, in order to reliably perform torque adjustment and switching the operation mode in the clutch mode, the driver drill further includes a second operating member capable of adjusting a pressing force of the pressing means by rotative operation.

According to the first aspect of the present invention, the movement of the intermediate member is regulated by the interfering unit provided with the gear case which holds the intermediate member. Due to this, the intermediate member is securely locked without being influenced by tolerances among the components. Therefore, erroneous clutch operation in a drill mode can be effectively prevented, and excellent reliability can be achieved.

According to the second aspect of the present invention, in addition to the effect of the first aspect, any one of three operation modes, that is, the clutch mode, drill mode, and the percussion mode, can be selected only by rotative operation of the operating member. Therefore, outstanding usability can be achieved.

According to the third aspect of the present invention, in addition to the effect of the first or second aspect, torque adjustment in the clutch mode is performed by the second operating means, which is provided separately from the operating member. Therefore, switching of the operation mode can be performed irrespective of the position where torque adjustment is performed by the second operating member. Furthermore, the operation mode is prevented from being erroneously switched at the time of torque adjustment.

DETAILED DESCRIPTION OF THE PREFERRED EMBODDIMENTS

An embodiment according to the present invention is described below based on the drawings.

Figure 1:
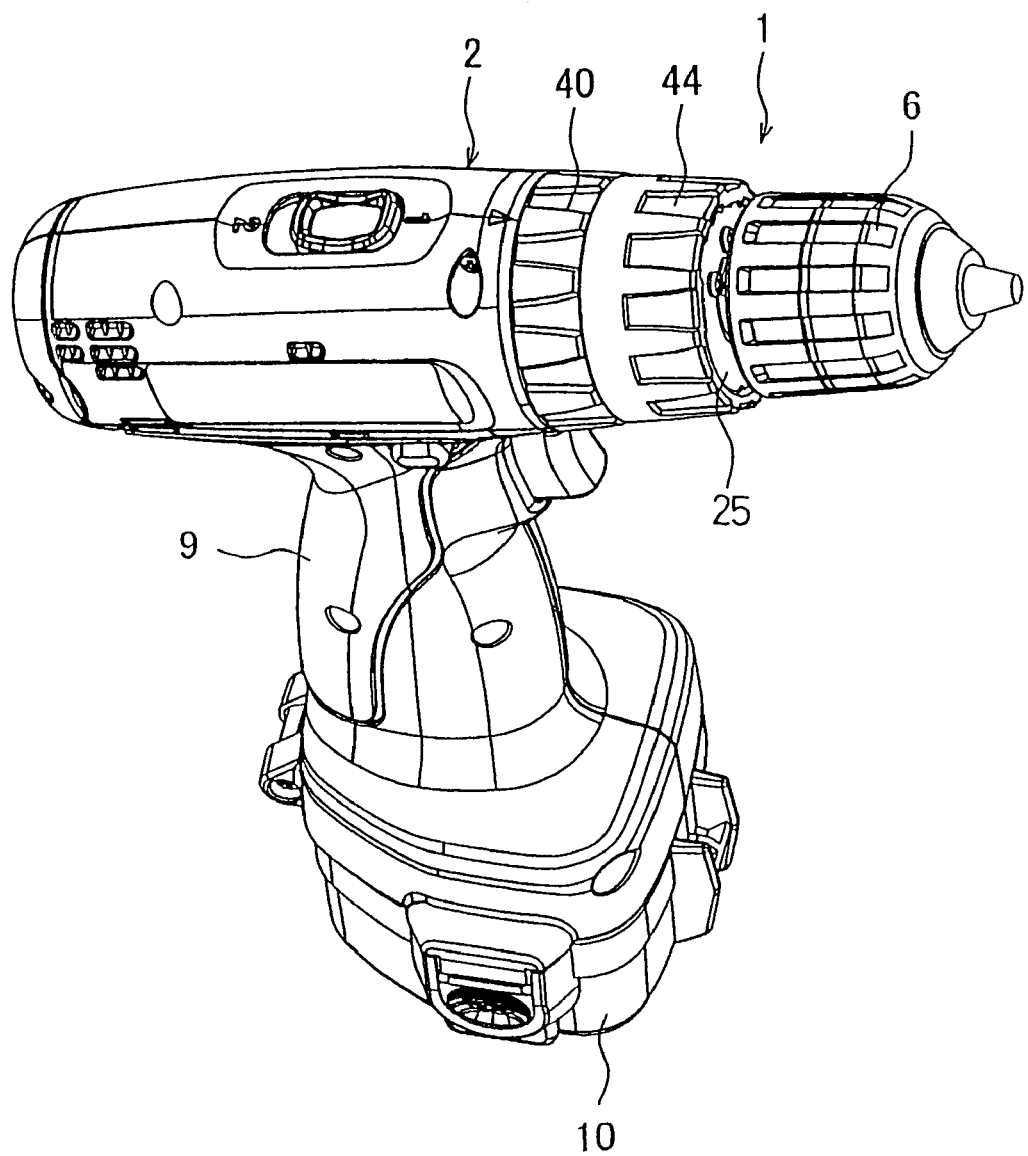
FIG. 1 is a perspective view of a percussion driver drill.
Figure 2:
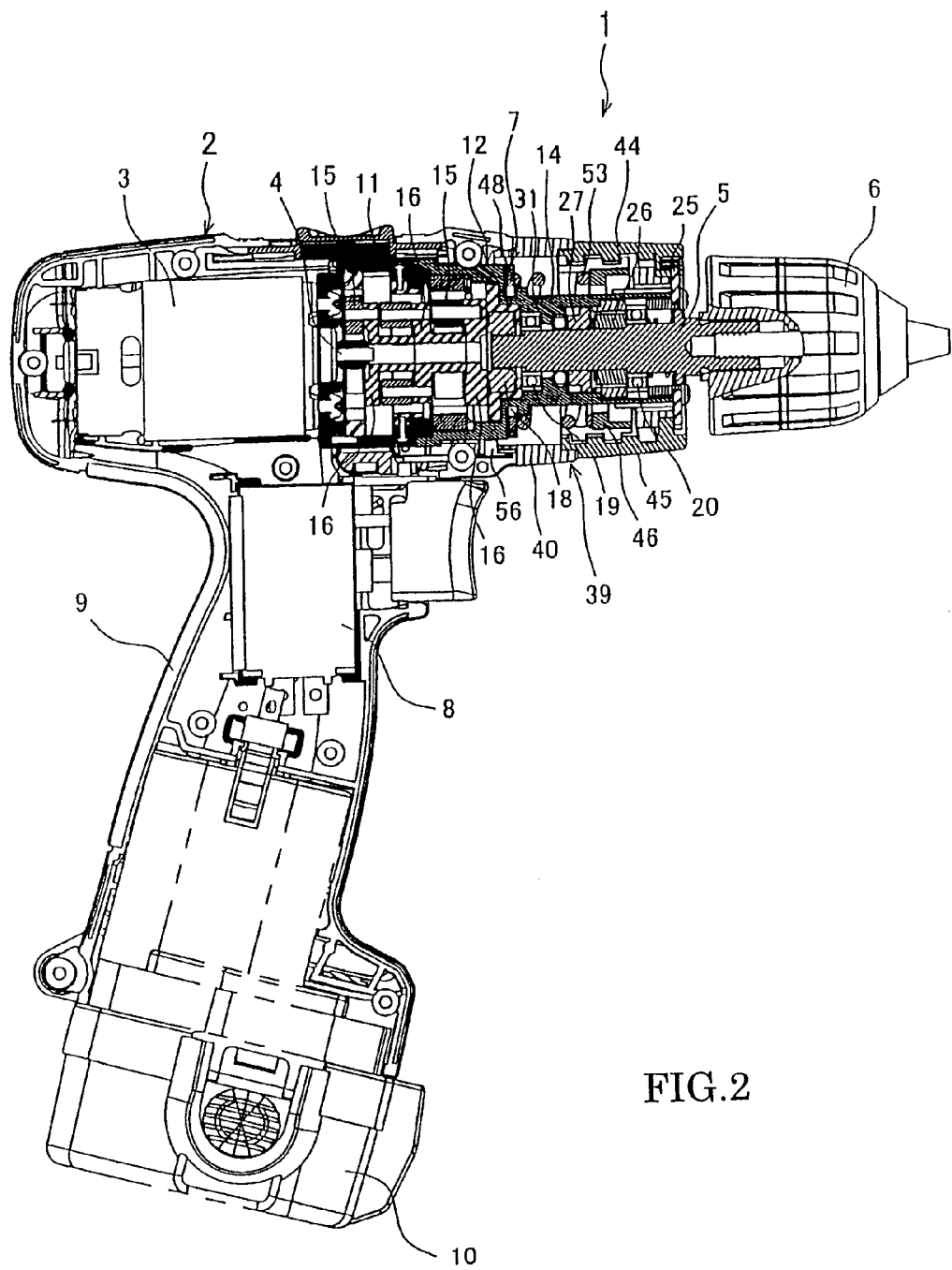
FIG. 2 is a vertical section view of the percussion driver drill.

FIG. 1 is a perspective view of a percussion driver drill, which is an example of a driver drill, and FIG. 2 is a vertical section view of the percussion driver drill. A percussion driver drill 1 has a motor 3 accommodated in a body housing 2 formed of a pair of right and left half-housings. From an output shaft 4 of the motor 3, rotation is transferred to a spindle 5 through a gear assembly 7 mounted at the front side (at the right in FIGS. 1 and 2) in the body housing 2 and from which the spindle 5 protrudes forward. At the front end of the spindle 5, a drill chuck 6 whose tip can hold a bit is provided. The reference number 8 denotes a switch for driving the motor 3, and the reference number 9 denotes a handle. Moreover, the reference number 10 denotes a battery pack as a power source mounted at the lower end of the handle 9.

Figure 3:
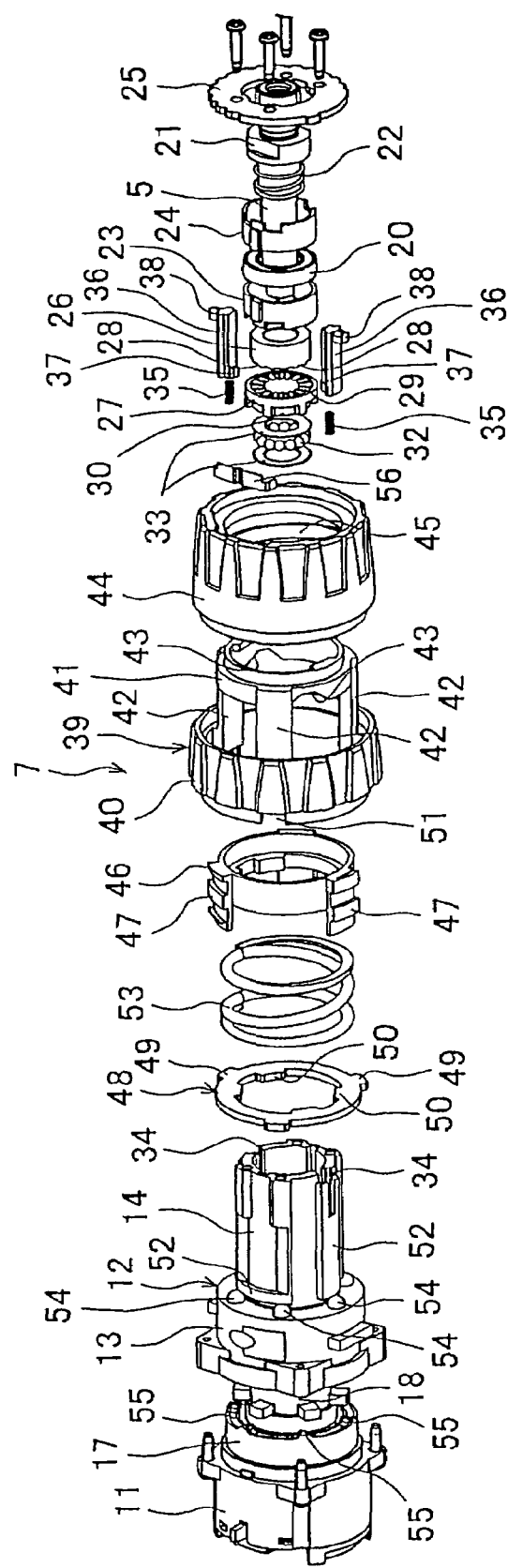
FIG. 3 is an exploded perspective view of a gear assembly.
Figure 4A:
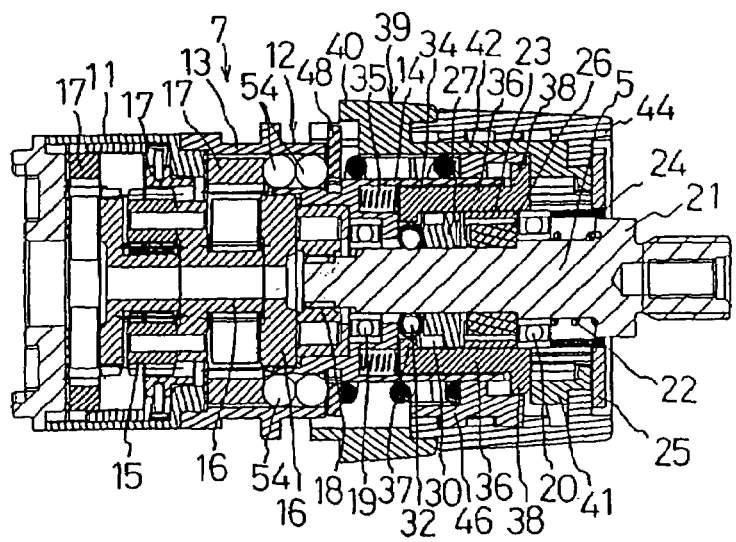
FIGS. 4A and 4B are vertical section views of the gear assembly in a clutch mode.
Figure 4B:
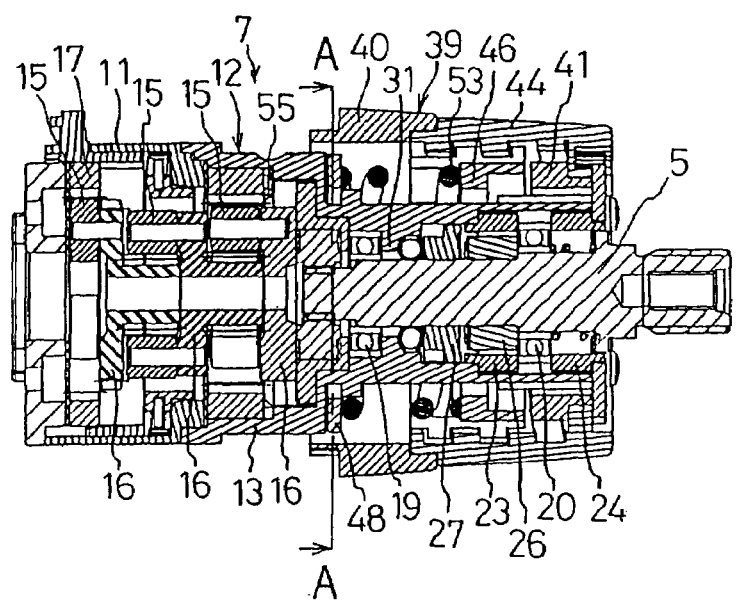

As shown in FIGS. 3 and 4, the gear assembly 7 includes a first gear case 11 and a second gear case 12 mounted at the front of the first gear case 11. As shown in FIG. 5A, the second gear case 12 has a two-step cylindrical shape with a large-diameter unit 13 and a small-diameter unit 14. A known planetary gear reduction mechanism is accommodated inside the first gear case 11 and the large-diameter unit 13. In the planetary gear reduction mechanism, a plurality of planetary gears 15, 15 . . . , carriers 16, 16 . . . supporting the same and internal gears 17, 17 . . . interlocked with the outer circumference of the planetary gears 15, 15 . . . are disposed in three layers. The spindle 5 is spline-connected at its rear end to a lock cam 18 which is integrally formed with the carrier 16 of the third layer. The spindle 5 is also axially supported by ball bearings 19 and 20 in the small-diameter unit 14 of the second gear case 12. Therefore, the spindle 5 receives the reduced speed of rotation of the output shaft 4, and also can move back and forth in an axial direction.

In a normal state, the spindle 5 is pressed toward a forward position where a first cam 26 (which will be described below) abuts on the ball bearing 20. The spindle is pressed by a flange 21 formed at the front side and a coil spring 22 externally mounted between the flange 21 and the ball bearing 20. The reference numbers 23 and 24 denote cylindrical spacers, inserted from the front side to the inner circumference of the small-diameter unit 14 for clipping and positioning the ball bearing 20. The reference number 25 denotes a disk-shaped stopper plate screwed to the front end of the small-diameter unit 14 for preventing the spacer 24 from coming off.

Also, between the ball bearings 19 and 20 around the spindle 5, a first cam 26 and a second cam 27 each having a ring shape are externally and coaxially mounted from the front side. The first cam 26 has first cam gears 28, 28 . . . on its rear surface, radially and continuously formed in a circumferential direction. The first cam is also integrally fixed to the spindle 5 inside the spacer 23. The second cam 27 has second cam gears 29, 29 . . . each having the same shape as the first cam gears 28, 28 . . . on its front surface facing to the first cam gears 28, 28 . . . . Moreover, the second cam 27 has a spline portion 30 on its outer circumference of its rear surface. The second cam 27 is slipped onto the spindle 5 with play, so that it can move back and forth in a rotational and axial direction. In a forward direction, the second cam 27 can only slightly move until a position where the second cam 27 is interlocked with the first cam 26. In a backward direction, the second cam 27 is regulated by a stopper 31 protruding toward the inner circumference of the small-diameter unit 14, and can slightly move until a position where the second cam 27 abuts on a pair of washers 33 holding a plurality of steel balls 32, 32 . . . .

Furthermore, the small-diameter unit 14 is formed with guide grooves 34, 34 . . . extending from its front end along the axial direction to be symmetrical to the point. In each of the guide grooves 34, a coil spring 35 and a percussion switching lever 36 are slidably provided. On an inner surface of the rear end of each percussion switching lever 36, an inner protrusion 37 is provided protruding toward the inner circumference of the small-diameter unit 14 so as to be interlockable with the spline portion 30 of the second cam 27 at a forward position. Also, on an outer surface of the front end of each percussion switching lever 36, an outer protrusion 38 is provided protruding toward the outer circumference of the small-diameter unit 14.

On the other hand, around the small-diameter unit 14, a mode-change ring 39 as an operating member is rotatably mounted between the front end of the body housing 2 and the stopper plate 25. The mode-change ring 39 includes an operation ring 40, a cam ring 41 and three connecting plates 42, 42 . . . . While the operation ring 40 has a diameter approximately equal to that of the front end of the body housing 2, the cam ring 41 has a diameter smaller than that of the operation ring 40 and is positioned at the front thereof. The three connecting plates 42, 42 . . . extend from the outer circumference of the cam ring 41 in the axial direction and are uniformly spaced apart in a circumferential direction for connecting both the rings 40 and 41. The cam ring 41 of this mode-change ring 39 abuts on the outer protrusion 38 of the percussion switching lever 36 at its rear-end edge. This configuration makes it possible to regulate the forward position of the percussion switching lever 36 pressed forward by the coil spring 35. Also, a pair of cam concave portions 43, 43 are provided, each having a trapezoidal shape and being symmetrical to the point, at the rear-end edge of the cam ring 41. When the mode-change ring 39 is at a rotating position where the cam concave portions 43 are positioned in front of the outer protrusion 38, the percussion switching lever 36 goes forward to allow the inner protrusion 37 to be engaged with the spline portion 30 of the second cam 27. Furthermore, when the mode-change ring 39 is at a rotating position where the cam concave portions 43 are not positioned in front of the outer protrusion 38, the percussion switching lever 36 goes backward to allow the inner protrusion 37 to be disengaged from the spline portion 30 of the second cam 27.

The reference number 44 denotes a cylindrical change ring as a second operating member externally and rotatably mounted around the mode-change ring 39 between the front side of the operation ring 40 and the stopper plate 25. An internal screw portion 45 is provided in the inner circumference of the change ring 44. Around the small-diameter unit 14, a spring holder 46 is provided so as to move in the axial direction. In the spring holder 46, an external screw portion 47 protrudes from the connecting plates 42, 42 . . . of the mode-change ring 39 to be screwed into the internal screw portion 45 of the change ring 44. Therefore, when the mode-change ring 39 is rotated, the spring holder 46 is screwed toward in the axial direction.

Figure 5A:
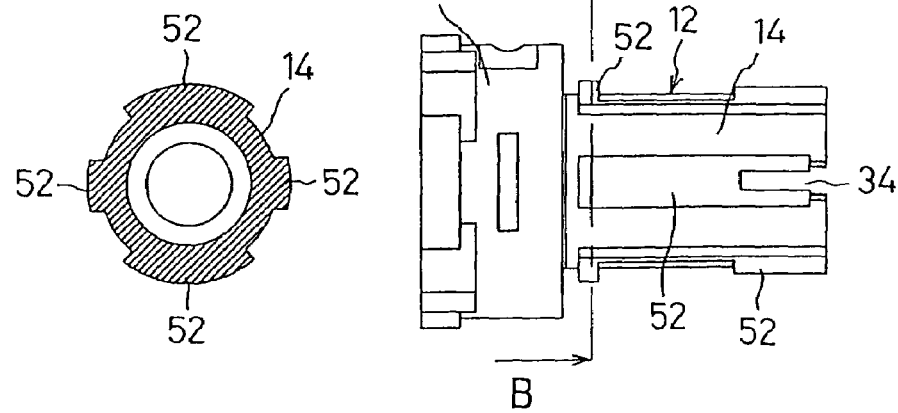
FIG. 5A shows a side view and a section view taken along line B—B of a second gear case.
Figure 5B:
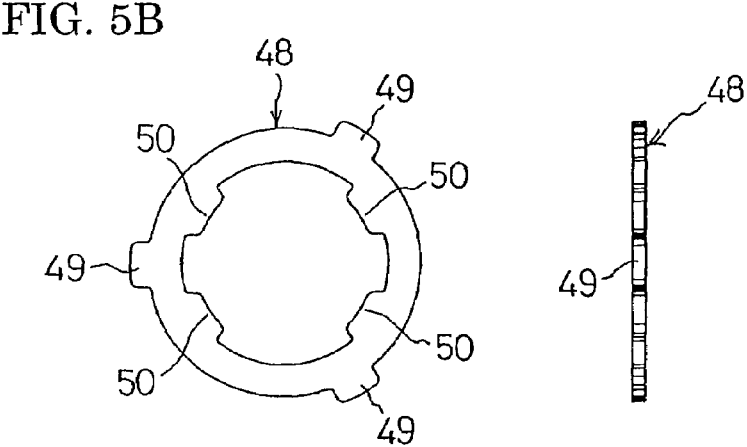
FIG. 5B is an illustration for describing a flat washer.
Figure 5C:
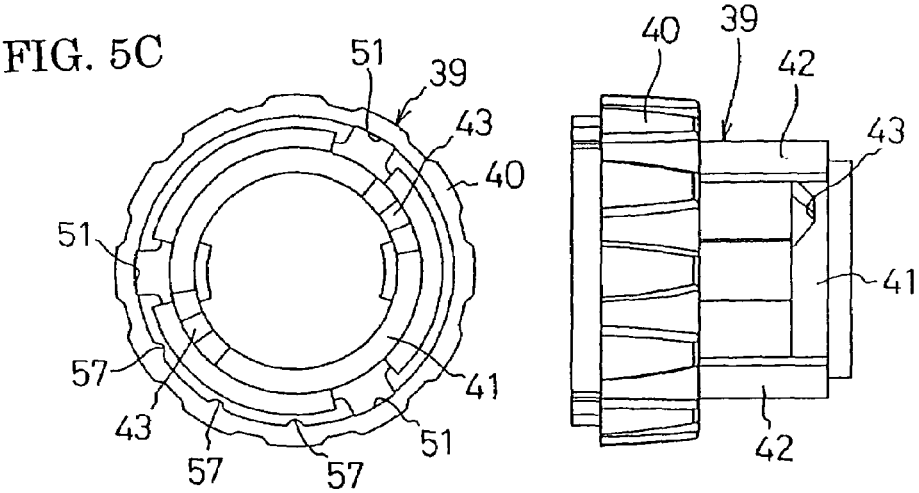
FIG. 5C is an illustration for describing a mode-change ring.
Figure 6:
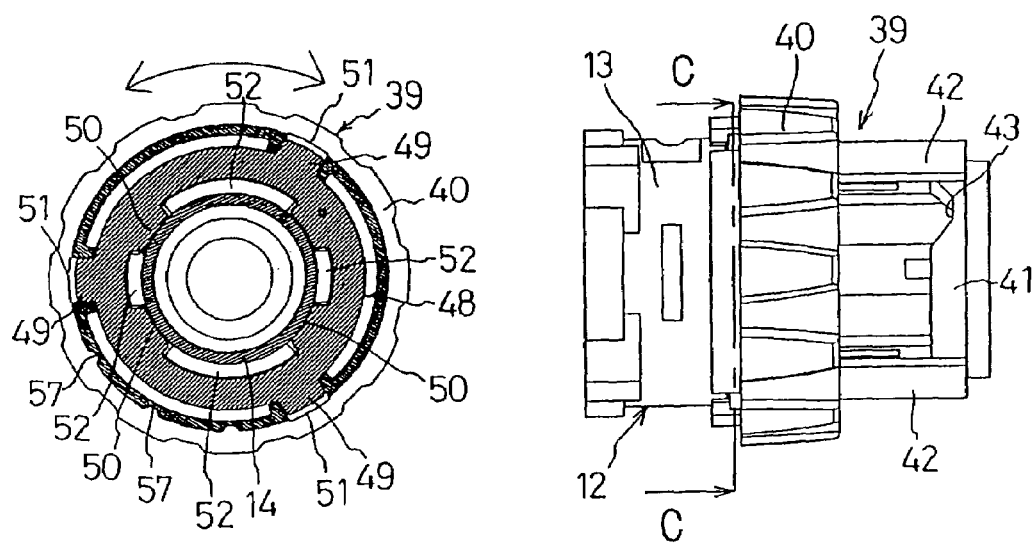
FIG. 6 shows a side view and a section view taken along line C—C of the second gear case with the mode-change ring attached thereto.

On the other hand, as shown in FIG. 5B, around the bottom of the small-diameter unit 14, a flat washer 48 is provided as an intermediate member. The flat washer 48 has three external projections 49, 49 . . . protruding from an edge of the outer circumference of the small-diameter unit 14 and uniformly spaced apart in a circumferential direction, and also has four internal projections 50, 50 . . . protruding from an edge of the inner circumference thereof and forming two pairs with bilateral symmetry. As shown in FIG. 5C and FIG. 6, the external projections 49, 49 . . . fit in concave grooves 51, 51 . . . provided in the axial direction to the inner circumference of the operation ring 40 of the mode-change ring 39, and are rotatable integrally with the mode-change ring 39 and movable separately in the axial direction. As shown in FIG. 5A, protruding streaks 52, 52 . . . as interfering units are provided along the axial direction on the outer circumference of the small-diameter unit 14. The protruding streaks 52, 52 . . . are formed on a front side of the small-diameter 14 having a distance of the approximate thickness of the flat washer 48 from the front surface of the large-diameter unit 13. A part of the protruding streaks 52, 52 . . . coincides with a shape of the inner circumference of the flat washer 48 and the remaining part of the same rides on the internal projections 50, 50 . . . in the axial direction. Therefore, the flat washer 48 can rotate at the bottom of the small-diameter unit 14 where the protruding streaks 52 are not provided (at a backward position, which will be described further below). On the other hand, the flat washer 48 can move forward from that bottom only at a coinciding position (a lock-releasing position) shown in FIG. 6 where the internal projections 50 do not interfere with the protruding streaks 52 in the axial direction.

Between the flat washer 48 and the spring holder 46, a coil spring 53 serving as a pressing means is externally mounted around the small-diameter unit 14 to press the flat washer 48 toward the large-diameter unit 13. Inside the large-diameter unit 13 at the rear of the flat washer 48, sets of two steel balls 54, 54 . . . aligned back and forth are provided as engaging members. The steel balls 54, 54 . . . are uniformly spaced apart and held in the circumferential direction. With this configuration, the steel balls 54, 54 . . . can abut on the front surface of the internal gear 17 rotatably provided to the third layer of the planetary gear reduction mechanism, and can be engaged in the circumferential direction with clutch cams 55, 55 . . . . Each of the clutch cams 55, 55 . . . has a trapezoidal shape, and it protrudes from the front surface of the internal gear 17 to the circumferential direction and are uniformly spaced apart. Through these steel balls 54, 54 . . . and the flat washer 48, a biasing force of the coil spring 53 is directly transferred to the internal gear 17. Therefore, rotation of the internal gear 17 is regulated by the biasing force of the coil spring 53. Also, as the spring holder 46 is screwed in accordance with the rotative operation of the change ring 44, the length of the coil spring 53 in the axial direction is changed, thereby allowing the biasing force to the internal gear 17 to be changed. Here, in this pressing state, the flat washer 48 is at the backward position which is close to, but does not allow the flat washer 48 to make contact with, the front surface of the large-diameter unit 13.

In the above-structured percussion driver drill 1, as will be described in the following, any one of three operation modes can be selected based on the rotating position of the mode-change ring 39 accompanied by back-and-forth movement of the percussion switching lever 36 and the rotation of the flat washer 48.

Figure 4C:
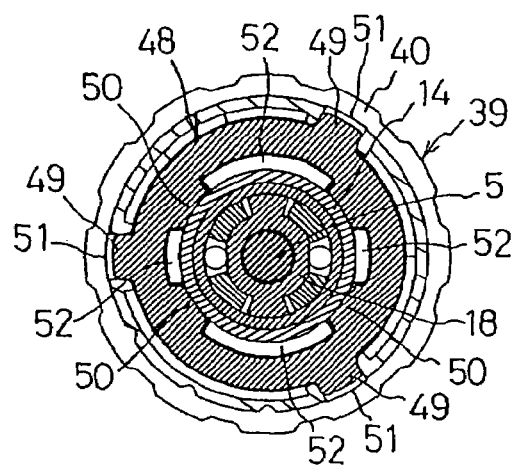
FIG. 4C is a section view taken along line A—A shown in FIG. 4B.

Firstly, as shown in FIG. 4C, in a first rotating position of the mode-change ring 39 at which the internal projections 50 of the flat washer 48 do not interfere with the protruding streaks 52 of the small-diameter unit 14 in the axial direction, the cam concave portions 43 of the cam ring 41 are positioned away from the front of the percussion switching lever 36. Therefore, as shown in FIG. 4A, the percussion switching lever 36 is at a backward position, and thus the inner protrusion 37 and the second cam 27 are not connected to each other. Accordingly, in a condition that the second cam 27 is freely rotatable and that the flat washer 48 is movable forward, rotative operation of the change ring 44 leads to a clutch mode, in which the pressing force to the flat washer 48 can be changed.

In this clutch mode, when the motor 3 is driven to rotate the spindle 5, screwing or the like can be performed with the driver bit mounted on the drill chuck 6. When screwing proceeds to a state in which a load on the spindle 5 exceeds the pressing force of the coil spring 53 locking the internal gear 17, the clutch cams 55, 55 . . . of the internal gear 17 push the steel balls 54, 54 . . . as well as the flat washer 48 forward to allow the internal gear 17 to idle, thereby ending screwing (clutch is operated). Here, as the driver bit is pressed toward a screw, the spindle 5 moves backward to allow the first cam 26 and the second cam 27 to be interlocked with each other. However, since the second cam 27 is freely rotatable, the second cam 27 rotates together with the first cam 26, and therefore percussion does not occur to the spindle 5.

Figure 7A:
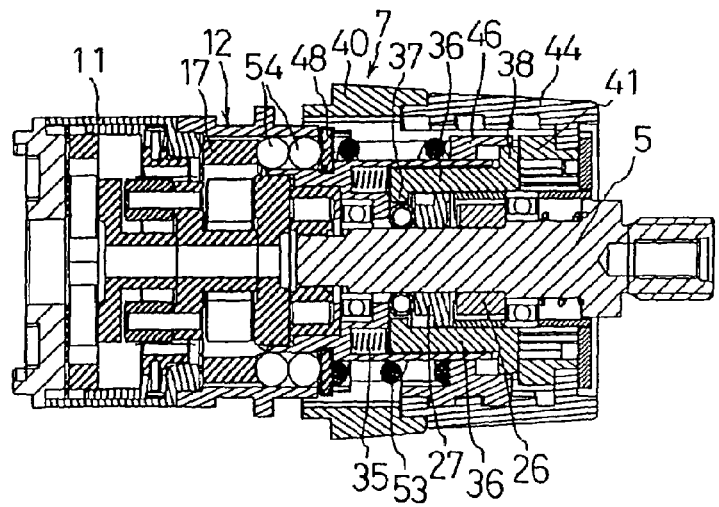
FIGS. 7A and 7B are vertical section views of the gear assembly in a drill mode.
Figure 7B:
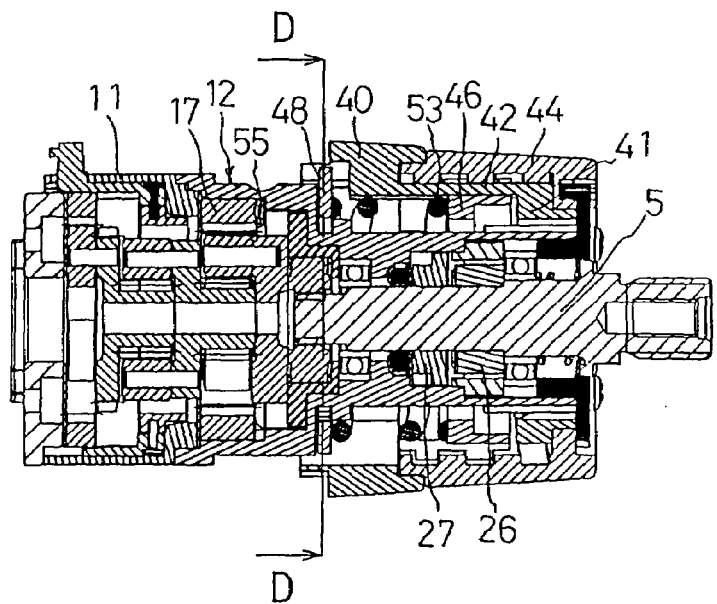
Figure 7C:
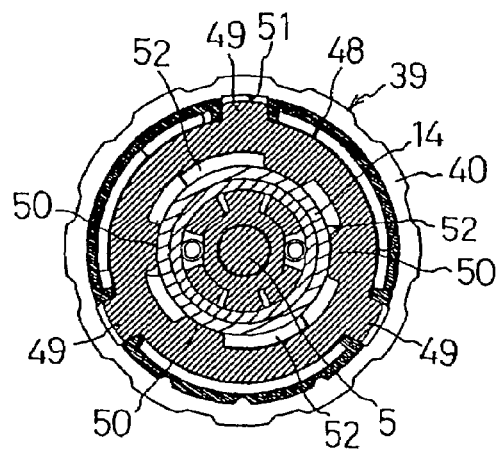
FIG. 7C is a section view taken along line D—D shown in FIG. 7B.

Next, as shown in FIGS. 7A to 7C, in a second rotating position where the mode-change ring 39 is rotated by 30 degrees to the left from the position in the clutch mode, the cam concave portions 43 of the cam ring 41 are not yet positioned in front of the percussion switching lever 36, and the percussion switching lever 36 is still at the backward position. At this time, the flat washer 48 rotates as shown in FIG. 7C to enable the internal projections 50 to move to a position behind the protruding streaks 52 of the small-diameter unit 14 (a locked position). This leads to a drill mode, in which the forward movement of the flat washer 48 is always regulated by the protruding streaks 52 irrespective of the pressing force of the coil spring 53.

When the spindle 5 is rotated in this drill mode, the steel balls 54, 54 . . . never go over the clutch cams 55 of the internal gear 17 irrespective of the load on the spindle 5. Therefore, the internal gear 17 is still locked, and the spindle 5 continues to rotate. Here, also at this time, the second cam 27 is still freely rotatable, and therefore percussion does not occur to the spindle 5.

Figure 8A:
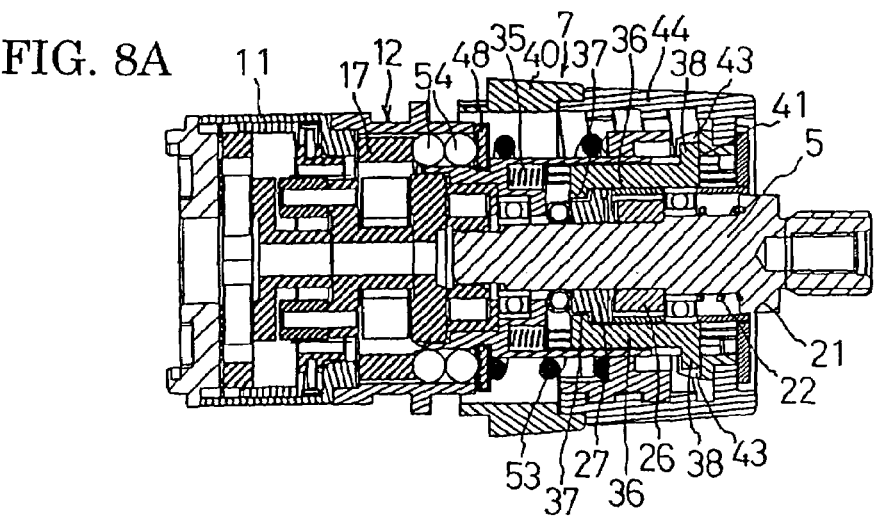
FIGS. 8A and 8B are vertical section views of the gear assembly in a percussion mode.
Figure 8B:
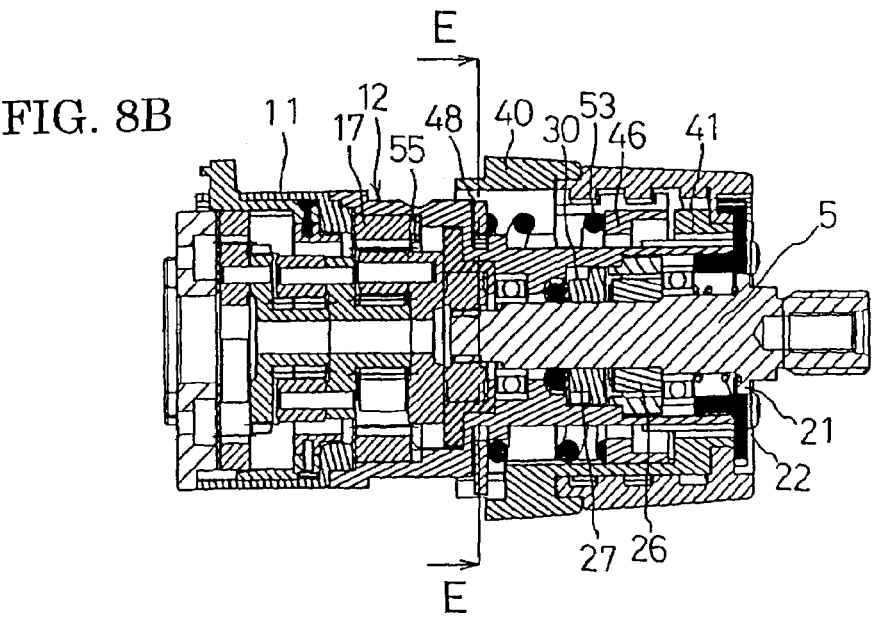
Figure 8C:
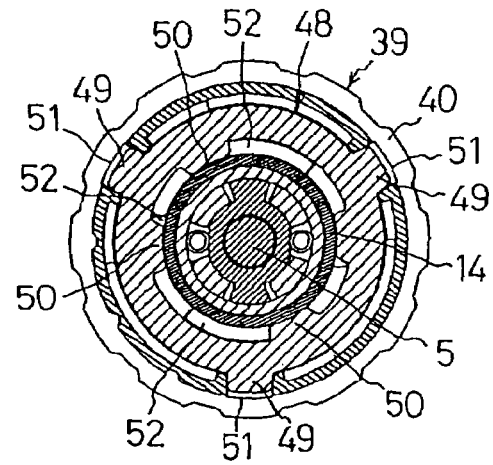
FIG. 8C is a section view taken along line E—E shown in FIG. 8B.

Then, as shown in FIGS. 8A to 8C, in a third rotating position where the mode-change ring 39 is further rotated by 30 degrees to the left from the position in the drill mode, the cam concave portions 43 of the cam ring 41 are positioned in front of the percussion switching lever 36, allowing the percussion switching lever 36 to move forward so as to connect the inner protrusion 37 to the second cam 27. On the other hand, interference in the axial direction between the inner protrusion 50 of the flat washer 48 and the protruding streaks 52 of the small-diameter unit 14 is not changed. This leads to a percussion mode, in which the first cam 26 and the second cam 27 are interlocked with each other at the backward position of the spindle 5.

When the spindle 5 is rotated in this percussion mode, the spindle 5 is moved backward by pressing the drill bit or the like onto a material to be processed. Then, the first cam 26 rotating integrally with the spindle 5 interlocks with the second cam 27 which is locked by the percussion switching lever 36, whereby percussion occurs to the spindle 5. Here, as the flat washer 48 is still locked by the protruding streaks 52, the spindle 5 continues to rotate irrespective of the load on the spindle 5.

A leaf spring 56 is fixed to the inner circumference at the front end of the body housing 2. On the other hand, as shown in FIG. 5C and FIG. 6, three concave portions 57, 57 . . . are provided around the outer circumference at the rear end of the operation ring 40 in the mode-change ring 39. The leaf spring 56 is engaged with each of the concave portions 57 at a rotating position corresponding to the relevant mode. In this way, click operation can be achieved for positioning the mode-change ring 39 in the relevant mode.

As described above, according to the percussion driver drill 1 in the embodiment described above, the protruding streaks 52 serve as the locking means for locking the flat washer 48. The protruding streaks are provided on the small-diameter unit 14 of the second gear case 12 to interfere with the flat washer 48 at a predetermined rotating position of the same to regulate its movement. By rotative operation of the mode-change ring 39, the flat washer 48 is rotated to a lock position where interference occurs with the protruding streaks 52 and to a lock-releasing position where interference does not occur with the protruding streaks 52. This allows either the clutch mode or the drill mode to be selected. Therefore, the flat washer 48 can be securely locked without being influenced by tolerances among the components. Due to this, erroneous clutch operation in the drill mode can be effectively prevented, and high reliability can be achieved.

Also, in the above embodiment, the mode-change ring 39 has a third rotating position other than rotating positions in the clutch mode and the drill mode, where the second cam 27 is locked by the percussion switching lever 36 and the front washer 48 interferes with the protruding streaks 52. With this configuration, by rotative operation of the mode-change ring 39, the percussion mode can be selected for the spindle 5. Therefore, any one of three operation modes, that is, the clutch mode, drill mode, and the percussion mode, can be selected only with the rotative operation of the mode-change ring 39, whereby outstanding usability is achieved.

Furthermore, in the above embodiment, the change ring 44 is provided for torque adjustment in the clutch mode, separately from the mode-change ring 39. Therefore, switching of the operation mode can be performed irrespective of the position where torque adjustment is performed by the change ring 44. Still further, the operation mode is prevented from being erroneously switched at the time of torque adjustment.

Here, in the above embodiment, the protruding streaks are provided with the small-diameter unit in the axial direction of the second gear case in order to regulate the movement of the flat washer. Alternatively, another interference unit, such as protruding streaks or pin-shaped protrusions provided in a circumferential direction, can regulate the movement of the flat washer. Also, the intermediate member is not restricted to the flat washer, but may be a cylindrical body. Furthermore, the engaging members are not restricted to the steel balls, and pins with their end being shaped like a cylinder or circle can be adopted.

Still further, the above embodiment is described with a percussion driver drill in which a percussion mode is selectable. However, a locking means similar to that in the above embodiment can be adopted for a driver drill not having a cam means and a percussion mode. Also, the present invention can be applied to even a driver drill or a percussion driver drill in which operation-mode selection and torque adjustment can be performed only with a single operating member.

What is claimed is:

1. A driver drill comprising:
    a housing having a spindle protruding forward;
    a motor housed in the housing;
    a planetary gear reduction mechanism housed in a gear case of the housing for transferring output of the motor to the spindle and allowing an internal gear provided in front of the spindle to be rotatable;
    an engaging member held in the gear case for engaging with an end face of the internal gear;
    a pressing means that presses the engaging member from the front through an intermediate member held movably in the axial direction by the gear case;
    an interfering unit provided in the gear case for interfering with the intermediate member at a predetermined rotating position thereof to regulate movement of the intermediate member in the axial direction, and
    an operating member capable of rotating the intermediate member by rotative operation,
    wherein by rotative operation of the operating member, the intermediate member is rotated to a lock position where interference occurs with the interference unit and to a lock-releasing position where no interference occurs with the interference unit,
    thereby at the lock position a drill mode can be selected for regulating the movement of the intermediate member and prohibiting the internal gear from idling, and at the lock-releasing position a clutch mode can be selected for releasing the regulation of the movement of the intermediate member and allowing the internal gear to idle.

2. The driver drill according to claim 1, further comprising
    a cam means that can add a percussion movement to an axial direction in conjunction with the spindle, wherein the operating member has a third rotating position other than rotating positions in the clutch mode and the drill mode, where the cam means is in conjunction with the spindle and the intermediate member interferes with the interfering unit, and by rotative operation of the operating member, a percussion mode in which percussion is transferred to the spindle can be further selected.

3. The driver drill according to claim 1, further comprising
    a second operating member capable of adjusting a pressing force of the pressing means by rotative operation.

4. The driver drill according to claim 1, wherein the gear case comprises different diameter units, which are a large-diameter unit holding the engaging member and a small-diameter unit axially supporting the spindle, and the interference part is a protruding streak formed in the axial direction at the outer circumference of the small-diameter unit at a predetermined distance away from the large-diameter unit, and the intermediate member is a flat washer externally provided at a portion where the protruding streak is not formed in the small-diameter unit and having a projection which interferes with the protruding streak in the axial direction at its inner periphery.

5. The driver drill according to claim 4, wherein the operating member is a cylindrical member externally provided at the small-diameter unit, and the flat washer is connected to the operating member for being rotatable integrally with the same as well as movable separately in the axial direction in a manner that the projection formed at its outer periphery is engaged with a groove formed in the axial direction at an inner periphery of the operating member.

6. The driver drill according to claim 4, wherein a cam means comprises a first cam housed in a small-diameter unit for rotating integrally with the spindle and a second cam which engages with the first cam for rotating, and the second cam provides percussion to the spindle when its rotation is regulated at the third rotating position of the operating member.

7. The driver drill according to claim 6, wherein rotation of the second cam is regulated by a switching lever slidably provided in a guide groove formed in the axial direction in the small-diameter unit, and the switching lever moves back and forth in the guide groove by rotative operation of the operating member and engages with the second cam at the third rotating portion of the operating member.

* * * * *